Figure 1:
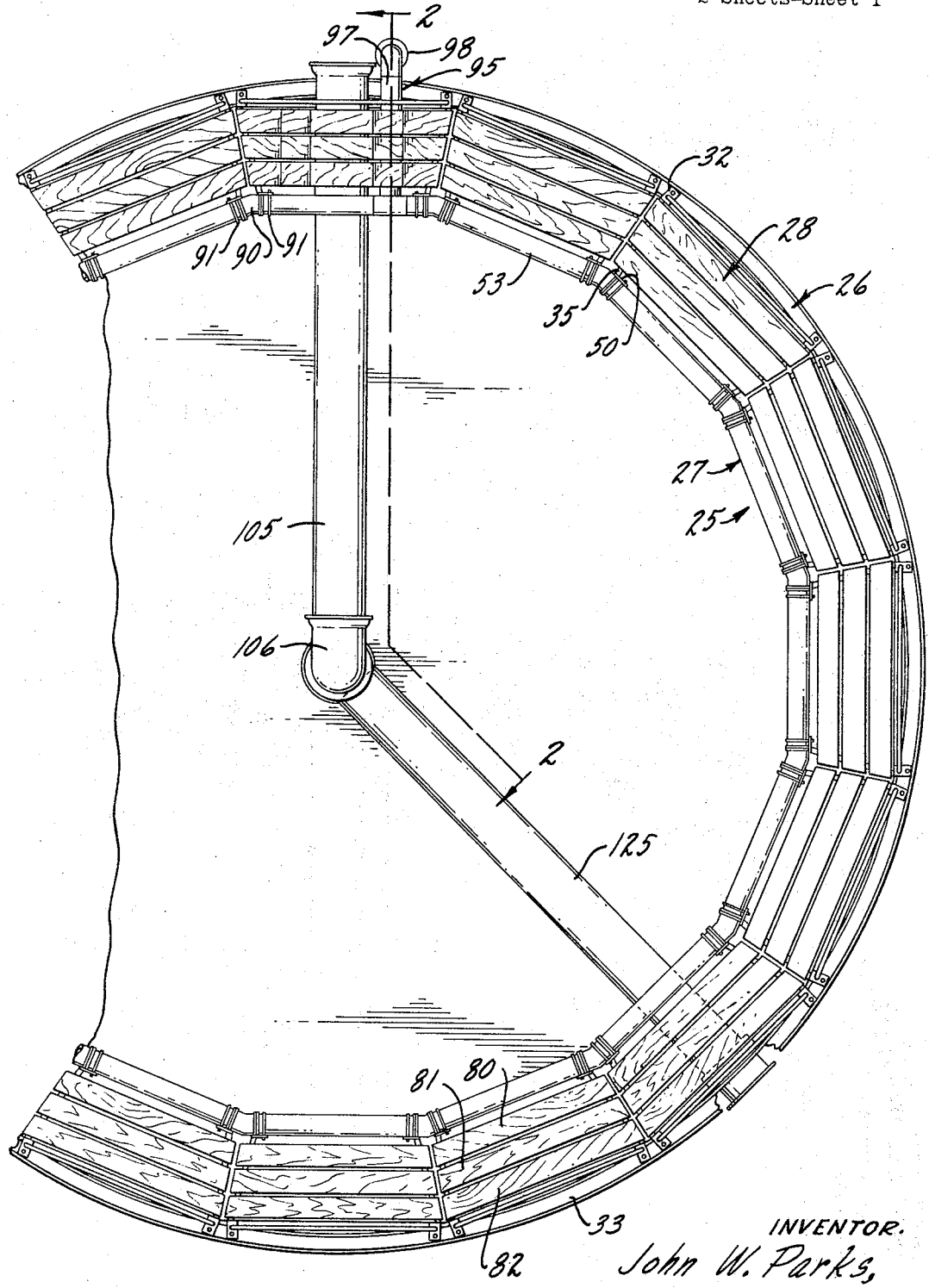

INVENTOR.
John W. Parks,
BY Hume, Groen, Clement & Hume
ATTORNEYS.

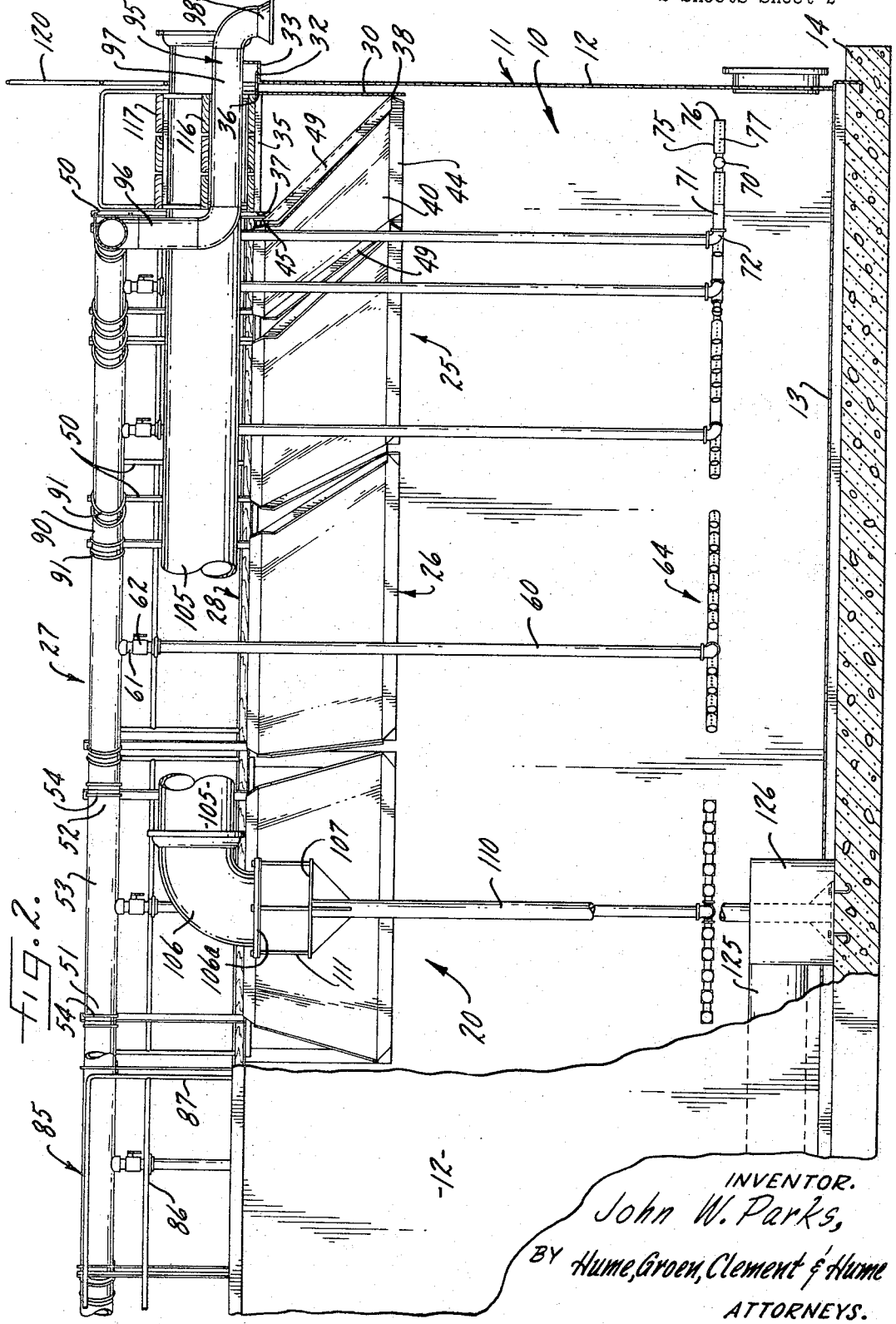

United States Patent Office 3,338,415
Patented Aug. 29, 1967

3,338,415
SEWAGE TREATMENT SYSTEM
John W. Parks, Shawnee Mission, Kans., assignor to Union Tank Car Company, Chicago, Ill., a corporation of New Jersey
Filed Feb. 17, 1965, Ser. No. 433,361
5 Claims. (Cl. 210—220)

This invention relates in general to sewage treatment. It deals more particularly with an aeration tank for a sewage treatment system.

It is conventional, in a multi-stage sewage treatment system, to employ one or more "aeration tanks" for the synthesis and aerobic digestion of solids in the solid laden liquid sewage. The aeration tanks are normall specially designed and constructed with extensive aeration and sewage mixing baffle equipment self-contained. Such tanks are, as might be expected, relatively complicated and expensive.

It is an object of the present invention to provide a simple and relatively inexpensive aeration and mixing tank for sewage treatment.

It is another object to provide an aeration and mixing system for sewage treatment which is readily adaptable to virtually any water tight storage tank.

It is yet another object to provide an aeration and mixing system which facilitates simply and expeditiously converting a conventional water tight storage tank into a complete sewage treatment aeration tank.

It is a further object to provide a prefabricated aeration and mixing system for assembly in a conventional water tight storage tank of substantially any configuration.

It is still a further object to provide an aeration and mixing system which is prefabricated in identical sections to facilitate adding or removing sections for the accommodation of various size tanks.

It is yet a further object to provide an aeration and mixing system of the aforedescribed character which can be assembled with a minimum of labor.

The foregoing and other objects are realized in accord with the present invention by providing a sewage treatment aeration and mixing system comprising a series of identical prefabricated sections which are assembled like building blocks in a conventional water tight storage tank, of any size and configuration. The identical sewage mixing and aeration sections are assembled and interconnected along the upper inner periphery of a storage tank and have air transfer, air diffuser, and sewage turning characteristics which, acting in concert, provide the system with a complete aeration and mixing program for the sewage introduced to the tank.

The invention, both as to its organization and method of operation, taken with further objects and advantages thereof, will best be understood by reference to the following description, taken in connection with the accompanying drawings, in which:

FIGURE 1 is a plan view, with parts broken away, of a conventional water tight storage tank modified with an aeration and mixing system embodying features of the present invention to make an aeration tank for sewage treatment; and FIGURE 2 is a sectional view taken along line 2—2 of FIGURE 1, with parts broken away.

Referring now to the drawings, a liquid storage tank incorporating a mixing and aeration system of the present invention is illustrated generally at 11. The tank 11 is a conventional circular cylindrical steel tank comprising a continuous wall 12 and a floor 13 mounted on a concrete base 14. Assembly of the mixing and aeration system 10 on the upper periphery of the wall 12, with the addition of a suitable sewage and activated sludge introduction and removal system 20 to the tank 11 transforms the tank into a complete sewage treatment aeration tank.

The system 10 embodying features of the present invention comprises a series of mixing and aeration sections 25 interconnected to form the complete system; the number of sections being determined solely by the diameter of the tank 11 (in cases where the tank is cylindrical). Since the mixing and aeration sections 25 are substantially identical, only one will be described in detail here. Corresponding components of the remaining sections 25 are given corresponding reference numerals.

Each mixing and aeration section 25 includes a combination turning baffle and support assembly 26 mounted on the upper periphery of the wall 12, an air header and diffuser assembly 27 mounted on the support assembly 26, and a walkway assembly 28 mounted on the support assembly 26. The air header and diffuser assembly 27 transmits air and emits it in the tank 11 to aerate the solid laden liquid sewage therein and cause it to circulate upwardly toward the baffle and support assembly 26 which turns the sewage inwardly to establish a desirable rotational flow. The walkway assembly 28 provides access to the entire system 10 for maintenance personnel.

The baffle and support assembly 26 includes a pair of vertically extending steel straps 30 braced against the inner surface of the tank wall 12 in circumferentially spaced relationship. The straps 30 have outwardly extending upper lips 32 which overlie the peripheral upper rim 33 formed on the tank 12 and are bolted thereto.

An angle member 35 is secured to the upper end of each strap by welding or the like, as at 36, and extends in cantilever relationship radially inwardly of the tank wall 12. The innermost end 37 of each angle member 35 and the lowermost end 38 of each vertical strap 30 are joined to a sewage baffle plate 40.

Since the straps 30 and the angle members 35 are of substantially equal length, the plate 40 is inclined inwardly from the tank wall 12 at a 45° angle. To accommodate the circular cylindrical configuration of the tank wall 12, the turning baffle plate 40 is generally trapezoidal in shape. A flange 44 is bent inwardly from the plane of the plate 40 to define its lower edge and stiffen the plate in a horizontal plane. Another flange 45 is bent upwardly from the plane of the plate 40 to define its upper edge and also provide horizontal stiffening. The inner ends 37 of the angle members 35 are welded to the flange 45.

Flanges 49 are bent inwardly from the plate 40 to define the edges of the plate and provide vertical stiffening. The plate 40, with its stiffening flanges 44, 45, and 49 thus defines a rigid sewage turning baffle and support assembly 26 with the pair of angle members 35 and the straps 30. This rigid assembly 26 provides a structural support for the walkway assembly 28 and the air header and diffuser assembly 27.

The air header and diffuser assembly includes a vertically disposed support post 50 welded to each end of the stiffening flange 45 and a corresponding angle member 35 and extending upwardly therefrom. Opposite ends of the air header pipe section 53 are secured to the inner sides of corresponding support posts 50 by conventional U-clamps 54. The header pipe section 53 is thus disposed over and slightly inwardly of the flange 45.

The pipe section 53 has an air diffuser drop pipe 60 connected to and depending therefrom at a central T-joint 61. A manually controlled valve 62 of conventional construction is interposed in the pipe 60 adjacent the joint 61 for controlling the flow of air from the pipe section 53 through the pipe 60 to an air diffuser unit 64.

The air diffuser unit 64 comprises an elongated horizontal manifold pipe 70 capped at both ends and connected to the lower end of the drop pipe 60 by a short pipe 71 and an elbow joint 72. The pipe 71 extends radially outwardly from the joint 72 so that the manifold pipe 70 is approximately centered under the baffle plate 40. The manifold pipe 70 has a plurality of spaced, diffuser elements 75 extending perpendicularly from opposite sides thereof, in a horizontal plane. Each of the diffuser elements 75 is a short pipe section capped at its outer end 76 and having a plurality of air outlet ports 77 formed in each side.

The walkway assembly 28 for each aeration section 25 includes three planks 80, 81, and 82 which overlie the angle members 35 of the sewage turning baffle and support assembly 27 and are secured thereto by any suitable means (not shown). The planks 80–82 are of increasing length from the inside plank 80 to the outside plank 82 and their opposite ends are cut so each plank is substantially trapezoidal in shape to accommodate adjacent aeration sections 25 in the circular cylindrical tank 11.

The walkway assembly further includes an outer handrail 85 mounted on the radially extending lips 36 of mounting straps 34. As will be seen, the handrail 85 is generally U-shaped (inverted) and a cross brace 86 interconnects its vertical legs 87. The lower ends of the legs 87 are secured to the lips 36 by welding or the like. The air header section 53 acts as an inner handrail.

Each of the aeration sections 25 which has been described to this point is a completely self-contained unit. The sections 25, when mounted in immediately adjacent relationship on the wall 12 of the tank 11, as illustrated, are unconnected to each other except for the air header sections 53 which must, of course, be interconnected to provide a common conduit for air directed to the diffuser units 64.

The air header sections 53 are interconnected by flexible, sleeve-type neoprene couplings 90 secured to corresponding adjacent ends 51 and 52 of the header sections by conventional ring clamps 91. Air is introduced to the interconnected series of header sections 53 through an L-shaped inlet conduit 95. The upstanding leg 96 of the inlet conduit 95 is connected in air tight relationship to one of the header sections 53 while the horizontal leg 97 extends outwardly over the walkway planks 80–82 of a corresponding walkway assembly 28. The open free end 98 of the inlet conduit 95 is adapted to be connected to any suitable source of air under pressure (not shown).

A horizontally extending sewage inlet pipe 105 also overlies the walkway planks 80–82 of the walkway assembly 28 with which the air inlet conduit 95 is associated. The pipe 105 terminates at a centrally disposed elbow having a downwardly directed outlet 106a positioned directly above a splash plate 107. The splash plate 107 and the inner end of the pipe 105, through the elbow 106, are supported by a central support column 110 extending upwardly through the floor of the tank 11 from the concrete base thereof. The splash plate 107 is spaced from and supports the elbow 106 on a peripherally arranged series of spacer rods 111.

To provide a walkway for personnel over the sewage inlet pipe 105 and the air inlet conduit 95 overlying the planks 80–82 of one walkway assembly 28, a stile is constructed on the walkway assembly in question. The stile comprises lower steps 116 formed of short plank sections suitably supported from the planks 80–82 on opposite sides of the sewage inlet pipe 105, and a top step 117 formed of slightly longer plank sections supported from the planks 80–82 in the same manner and extending over the sewage inlet pipe 105. A modified handrail 120 conforming generally to the configuration of the stile is utilized in lieu of the handrail 85 hereinbefore described. The lowest steps 116 on one side of the stile overlie the air inlet conduit 95.

The operation of the system 10 once it has been assembled in a suitable water tight storage tank 11 should be obvious. Sewage is introduced to the tank through the inlet pipe 105. At the same time activated sludge from the clarifier stage, for example, is introduced to the tank 11 at bottom center through a sludge inlet pipe 125 and header 126. The solid laden liquid sewage in the tank 11 is aerated by the rising bubbles of air emitted from the diffuser units 64 and supplied thereto by the interconnected header assemblies 53 from the air inlet conduit 95. At the same time, the rising air bubbles cause the sewage to circulate in what approximates a doughnut shaped path upwardly against the turning baffle plates 40 and inwardly toward the center of the tank 11, whereupon the sewage moves down toward the tank floor and outwardly toward the air diffuser units 64 once more.

After a predetermined period of aeration, the aerated sewage is removed from the tank 11 to suitable sewage handling equipment for transfer of the sewage to a clarifier stage of the sewage treatment, for example. The aeration cycle ordinarily ranges from in the neighborhood of one hour for an initial or synthesis stage aeration to four hours for aerobic digestion stage aeration.

The aeration and mixing system which has been described facilitates inexpensively modifying a standard liquid storage tank for use as a sewage treatment aeration tank. Any number of the aeration and mixing sections 25 can be joined together by air header couplings 90 to construct a system 10 for any size tank 11. The sections 25 are not interconnected in any other way, for ease of system assembly; and, in fact, are connected to the tank 11 only by the strap lips 32 bolted to the tank rim 33. Virtually no modification of a standard storage tank is thus necessary.

In operation, the system 10 is designed to prevent stagnation in the tank 11 by assuring some air up flow up behind the baffle plates 40. A certain portion of the rising air bubbles pass behind the lower stiffening flanges 44 of the plates 40 because the air diffuser units 64 are spaced a substantial distance below the plates. The gaps between baffle plates 40 permit circulation of floating solids from behind the plates.

If and when the hydraulics within the tank do not permit normal circulation of the floating solids and build-up occurs behind the baffles, a sequential distribution of air to the units 64 will chase the solids around the tank 11 to a point where they may be skimmed out from behind the last plate 40 manually with ease. To do this, all the air is initially shut off. One diffuser unit is then turned on, and as trapped solids float past the centers of the two adjacent units 64, those two are also turned on. This procedure is repeated in sequence around the entire tank 11 until all the floating solids are trapped behind the baffle plates 40 opposite the starting point. These floating solids can then be readily coaxed out from behind this baffle with a manual skimming tool (not shown).

What is claimed is:

1. An aeration and mixing system for converting a conventional liquid-tight storage tank having an upstanding side wall into a sewage treatment tank, comprising: a plurality of substantially identical aeration and mixing sections, means for mounting said sections in end-to-end relationship on and around the upper periphery of the tank wall, each of said sections including vertically extending member means adapted to be braced against the inside of the wall, horizontal support means attached to said member means and extending inwardly of the wall, and turning baffle means mounted on said vertically extending member means and inclined inwardly of the tank into supporting relationship with the inner ends of said support means, said baffle means in each section extending into generally edge-to-edge adjacent relationship, walkway means and air transfer pipe section means mounted on said support means in each section, conduit means interconnecting said pipe sections, air diffuser means depending below said baffle means from said pipe sections for emitting air to aerate the sewage in the tank and induce its flow in the tank upwardly against said baffle means and inwardly of the tank.

2. The system of claim 1 further characterized in that the storage tank has a generally circular cylindrical side wall and said aeration and mixing sections are arranged around said side wall in adjacent end-to-end relationship.

3. The system of claim 1 further characterized in that each of said baffle means comprises a generally trapezoidal shaped plate member having its longest edge positioned against the tank side wall and a baffle surface inclined away from the wall.

4. The system of claim 3 further characterized in that the edges of said baffle plate have flange means formed thereon to stiffen and form a structural support member of said baffle plate.

5. The system of claim 3 further characterized in that said vertically extending member means comprises strap members having outwardly disposed hook means formed at their upper ends and overlying the upper periphery of the tank wall.

References Cited

UNITED STATES PATENTS

| | | | |
|---|---|---|---|
| 1,286,775 | 12/1918 | Rein et al. | 261—124 |
| 2,126,228 | 8/1938 | Streander | 210—220 |
| 2,407,947 | 9/1946 | Butcher | 210—528 |
| 2,624,657 | 1/1953 | Anderson | 261—124 X |
| 3,028,011 | 4/1962 | McGivern | 210—220 |
| 3,195,727 | 7/1965 | Kibbee | 261—123 X |
| 3,220,706 | 11/1965 | Valdespino | 210—221 X |
| 3,233,922 | 2/1966 | Evans | 285—236 |

FOREIGN PATENTS

| | | |
|---|---|---|
| 651,167 | 3/1951 | Great Britain. |
| 925,993 | 5/1963 | Great Britain. |

OTHER REFERENCES

Dorr-Oliver, Bulletin No. 6192, 1953.

REUBEN FRIEDMAN, *Primary Examiner.*

SAMIH N. ZAHARNA, *Examiner.*

J. DE CESARE, *Assistant Examiner.*